United States Patent
Iwamatsu et al.

(10) Patent No.: US 12,085,517 B2
(45) Date of Patent: Sep. 10, 2024

(54) LIGHTING OPTICAL SYSTEM AND SUBSTRATE INSPECTING DEVICE

(71) Applicant: Hitachi High-Tech Corporation, Tokyo (JP)

(72) Inventors: Akihiro Iwamatsu, Tokyo (JP); Shunichi Matsumoto, Tokyo (JP); Masaya Yamamoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 213 days.

(21) Appl. No.: 17/916,629

(22) PCT Filed: Apr. 10, 2020

(86) PCT No.: PCT/JP2020/016116
§ 371 (c)(1),
(2) Date: Oct. 3, 2022

(87) PCT Pub. No.: WO2021/205650
PCT Pub. Date: Oct. 14, 2021

(65) Prior Publication Data
US 2023/0142646 A1   May 11, 2023

(51) Int. Cl.
*G01N 21/95* (2006.01)
*G01N 21/88* (2006.01)
*G01N 21/94* (2006.01)

(52) U.S. Cl.
CPC ..... *G01N 21/9501* (2013.01); *G01N 21/8806* (2013.01); *G01N 21/94* (2013.01); *G01N 2021/8809* (2013.01)

(58) Field of Classification Search
CPC ........... G01N 21/9501; G01N 21/8806; G01N 21/94; G01N 2021/8809; G02B 19/00; G02B 27/09
See application file for complete search history.

(56) References Cited

U.S. PATENT DOCUMENTS

| 4,521,087 A | 6/1985 | Hayes et al. |
| 7,199,946 B2 | 4/2007 | Jeong |

(Continued)

FOREIGN PATENT DOCUMENTS

| JP | 59-216118 A | 12/1984 |
| JP | 5-26818 A | 2/1993 |

(Continued)

OTHER PUBLICATIONS

International Search Report (PCT/ISA/210) issued in PCT Application No. PCT/JP2020/016116 dated Jul. 14, 2020 with English translation (six (6) pages).

(Continued)

*Primary Examiner* — Hung V Nguyen
(74) *Attorney, Agent, or Firm* — Crowell & Moring LLP (57) ABSTRACT

This illumination optical system has a laser light source (301, 401, 501), a light collection optical system (311, 4*il*, 51*i*), and a support structure (312, 412) that is able to secure the laser light source and the light collection optical system, wherein the light from the laser light source is focused onto an object to be inspected (307, 407, 507). The light collection optical system includes a cylindrical mirror (306, 406, 506), and at least one cylindrical lens (304, 404*a*, 404*b*, 4G4*c*, 504*a*, 5046, 504*c*). The cylindrical mirror is an optical element that collects light in a first direction, and the cylindrical lens is an optical element that collects light in a second direction perpendicular to the first direction. The focal distance of the cylindrical lens to the object to be inspected is greater than the focal distance of the cylindrical mirror to the object to be inspected.

10 Claims, 5 Drawing Sheets

(56) References Cited

U.S. PATENT DOCUMENTS

| | | | |
|---|---|---|---|
| 9,976,966 B2 * | 5/2018 | Shibata | G01N 21/94 |
| 2010/0225903 A1 | 9/2010 | Nishiyama et al. | |
| 2012/0218545 A1 | 8/2012 | Zhang et al. | |
| 2013/0321798 A1 | 12/2013 | Urano et al. | |
| 2015/0022806 A1 | 1/2015 | Shibata et al. | |

FOREIGN PATENT DOCUMENTS

| | | |
|---|---|---|
| JP | 2008-275540 A | 11/2008 |
| JP | 2012-98103 A | 5/2012 |
| JP | 2013-532841 A | 8/2013 |
| JP | 2015-4619 A | 1/2015 |
| WO | WO 2006/133206 A1 | 12/2006 |
| WO | WO 2013/136574 A1 | 9/2013 |

OTHER PUBLICATIONS

Japanese-language Written Opinion (PCT/ISA/237) issued in PCT Application No. PCT/JP2020/016116 dated Jul. 14, 2020 (four (4) pages).

* cited by examiner

CONTROL UNIT

- ALLOW ILLUMINATION OPTICAL SYSTEM TO CHANGE LONGITUDINAL BEAM DIAMETER OF LINEAR LIGHT DEPENDING ON INSPECTION CONDITION

- CONTROL LONGITUDINAL DIAMETER OF BEAM SPOT OF LINEAR LIGHT BASED ON FOCAL LENGTH OF CONDENSER LENS WITH RESPECT TO SAMPLE

- INCREASE LONGITUDINAL BEAM DIAMETER OF LINEAR LIGHT FOR LONG SAMPLING INTERVAL, AND DECREASE LONGITUDINAL BEAM DIAMETER OF LINEAR LIGHT FOR SHORT SAMPLING INTERVAL

- CHANGE LONGITUDINAL BEAM DIAMETER OF LINEAR LIGHT IN RANGE FROM SEVERAL DOZEN TO SEVERAL HUNDRED MICROMETERS

- CONTROL ROTATIONAL STAGE IN EITHER CONSTANT ANGULAR VELOCITY MODE OR CONSTANT LINEAR VELOCITY MODE DEPENDING ON INSPECTION CONDITION

LIGHTING OPTICAL SYSTEM AND SUBSTRATE INSPECTING DEVICE

TECHNICAL FIELD

The present invention relates to an illumination optical system and a substrate inspection apparatus.

BACKGROUND ART

The illumination optical system and the substrate inspection apparatus are used for detecting a particle on an inspection object by irradiating a surface of the inspection object with light and detecting reflected or scattered light from the inspection object.

In a manufacturing line of a semiconductor substrate, a thin-film substrate, and the like, a defect on a surface of the semiconductor substrate, the thin-film substrate, and the like is inspected to maintain or improve a product yield. The defect inspection can be performed using an inspection apparatus.

Patent Literature 1 (PTL 1) discloses that a beam spot of linear light obliquely incident on a specimen has different resolutions between longitudinal and lateral directions, leading to inefficient inspection. To solve this, PTL 1 further discloses that a light collecting optical system with a set of two catoptric elements including a positive element having a positive focal distance and a negative element having a negative focal distance, or a light collecting optical system with a set of a transmission element and a catoptric element, respectively including a positive element and a negative element, is used to cancel pupil distortions and form a beam spot on the specimen.

Unfortunately, PTL 1 gives no disclosure or suggestion on an issue that longitudinal beam spot diameter is intended to be flexibly changed depending on inspection conditions or stage operation while a beam spot is focused.

A smaller defect or particle is recently required to be detected due to technological innovation. A recent optical inspection apparatus requires a shorter-wavelength light source or reduced lateral beam spot diameter. It is therefore required to accurately focus a thinner linear beam spot on a specimen surface.

CITATION LIST

Patent Literature

PTL 1: U.S. Pat. No. 7,199,946.

SUMMARY OF INVENTION

Technical Problem

As the beam spot diameter is reduced based on such requirement of higher sensitivity of defect inspection, a focal depth is reduced in an oblique optical system in which a specimen is obliquely irradiated with light. As a result, it is further difficult to focus a beam spot on a specimen surface. Meanwhile, high-speed inspection is also required, and thus a design is required to increase a longitudinal irradiation range while maintaining accurate focusing of the beam spot in both the longitudinal and lateral directions.

An object of the invention, which is made to solve such an issue, is to provide an illumination optical system and a substrate inspection apparatus, by which a light beam can be collected linearly and accurately, and a beam spot can be controlled accurately in the longitudinal direction.

Solution to Problem

An exemplary illumination optical system according to the invention is an illumination optical system that includes a light source and a light collecting optical system and collects light from the light source on a specimen, where the light collecting optical system includes a cylindrical mirror and at least one condenser lens, the cylindrical mirror has a parabola section defined by a plane perpendicular to a ridgeline thereof, and has a paraboloid formed such that the parabola has the same curvature at any place on the ridgeline, and collects the light in a first direction by the paraboloid, the condenser lens collects the light in a second direction perpendicular to the first direction, and focal length of the condenser lens is longer than focal length of the cylindrical mirror.

Advantageous Effects of Invention

According to the illumination optical system and the substrate inspection apparatus of the invention, a light beam can be collected linearly and accurately.

In particular, according to one embodiment of part of the invention, the light beam can be collected linearly and accurately regardless of a light incident angle with respect to an inspection object.

According to one embodiment of part of the invention, transmittance of the illumination optical system is increased.

According to one embodiment of part of the invention, the illumination optical system and the substrate inspection apparatus can be made inexpensive or smaller in a configuration where longitudinal length of a beam spot is variable.

DESCRIPTION OF EMBODIMENTS

Some embodiments of the invention are now described with reference to the accompanied drawings.

First Embodiment

Figure 1:
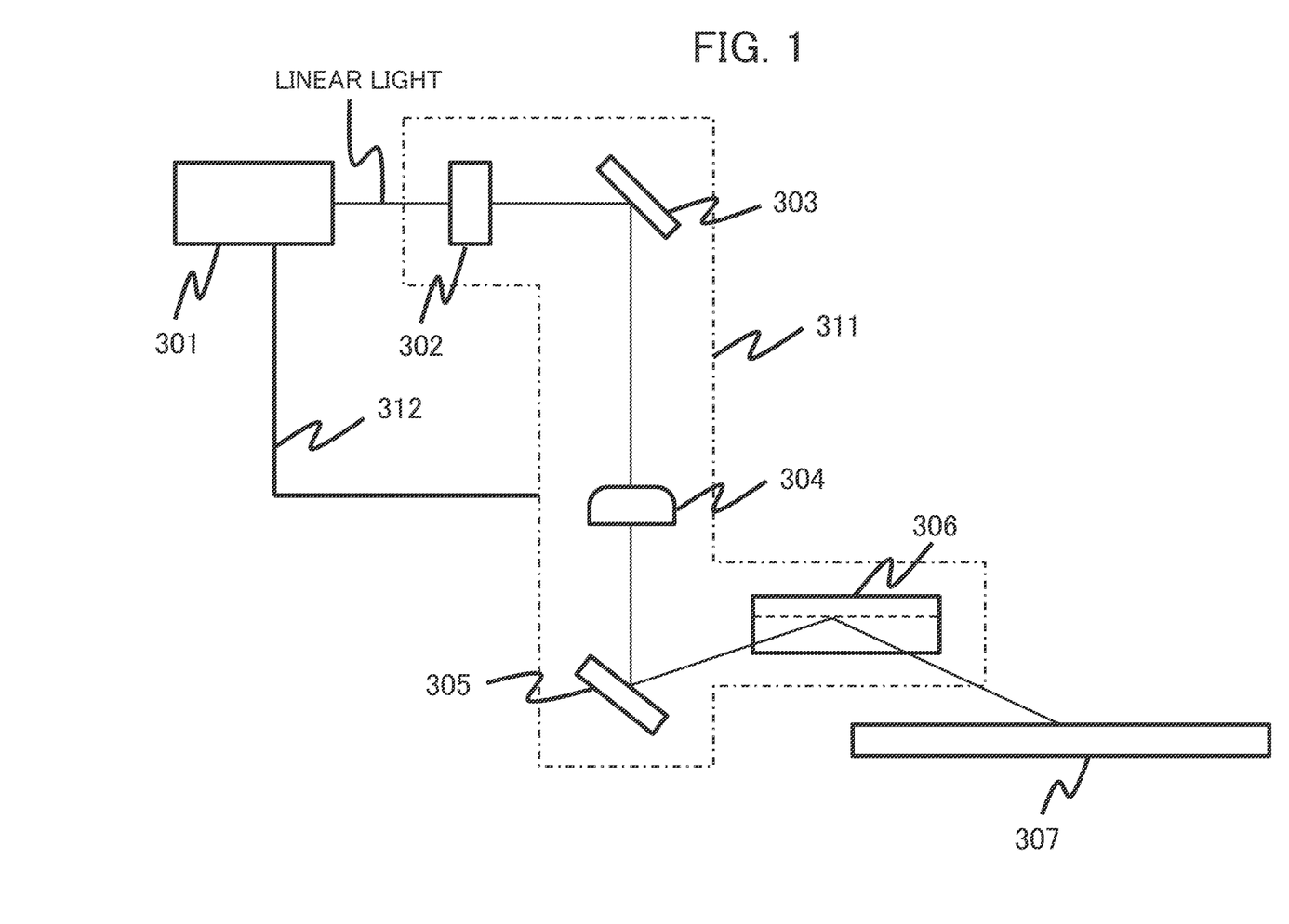
FIG. 1 illustrates a configuration of an illumination optical system according to a first embodiment of the invention.

FIG. 1 illustrates a configuration of an illumination optical system according to a first embodiment of the invention. The illumination optical system includes a laser light source 301 (light source) and a light collecting optical system 311. In the first embodiment, the laser light source 301 emits parallel light, which may be referred to as linear light. FIG. 1 schematically illustrates the parallel light in a form of a straight line.

The illumination optical system includes a support structure 312. The support structure 312 can fix the laser light source 301 and the light collecting optical system 311. The support structure 312 may be configured of a single fixing member or a support member, or may be a mechanical structure as an assembly of a plurality of members. The support structure 312 can be controlled by a control unit (not shown).

The light collecting optical system 311 includes a cylindrical lens 304 (condenser lens) and a cylindrical mirror 306. As a result, the illumination optical system collects light from the laser light source 301 on an inspection object 307 (specimen).

For example, light emitted from the laser light source 301 is regulated in light quantity by an attenuator 302 and reflected by a mirror 303. The light is then transmitted by the cylindrical lens 304, reflected by a mirror 305, and then collected by the cylindrical mirror 306 and collectively applied onto the inspection object 307.

Figure 2:
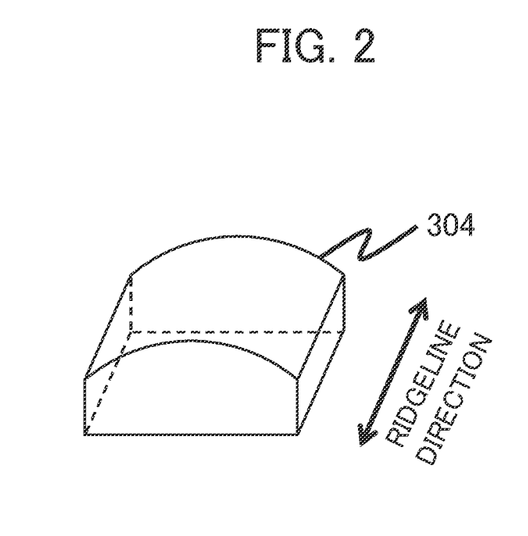
FIG. 2 illustrates an exemplary schematic shape of a cylindrical lens in FIG. 1.

FIG. 2 illustrates an exemplary schematic shape of the cylindrical lens 304. In this example, the cylindrical lens 304 has a cylindrical incidence surface and a planar outgoing surface. The cylindrical lens 304 is disposed to have a ridgeline in a direction perpendicular to the plane of paper of FIG. 1. In FIG. 1, since the optical axis is disposed parallel to the plane of paper, the ridgeline of the cylindrical lens 304 is perpendicular to the optical axis.

The cylindrical lens 304 is disposed on a side near the laser light source 301 with respect to the cylindrical mirror 306. The cylindrical lens 304 is an optical element that collects light in a uniaxial direction. The light collecting direction (second direction) of the cylindrical lens 304 is a horizontal direction on the plane of paper of FIG. 1. The focal length of the cylindrical lens 304 is designed such that light is collected on the inspection object 307.

The cylindrical mirror 306 is disposed to have a ridgeline in the horizontal direction on the plane of paper of FIG. 1. In FIG. 1, since the light axis is disposed parallel to the plane of paper, the ridgeline of the cylindrical mirror 306 is disposed in the same plane as the light axis.

Figure 3:
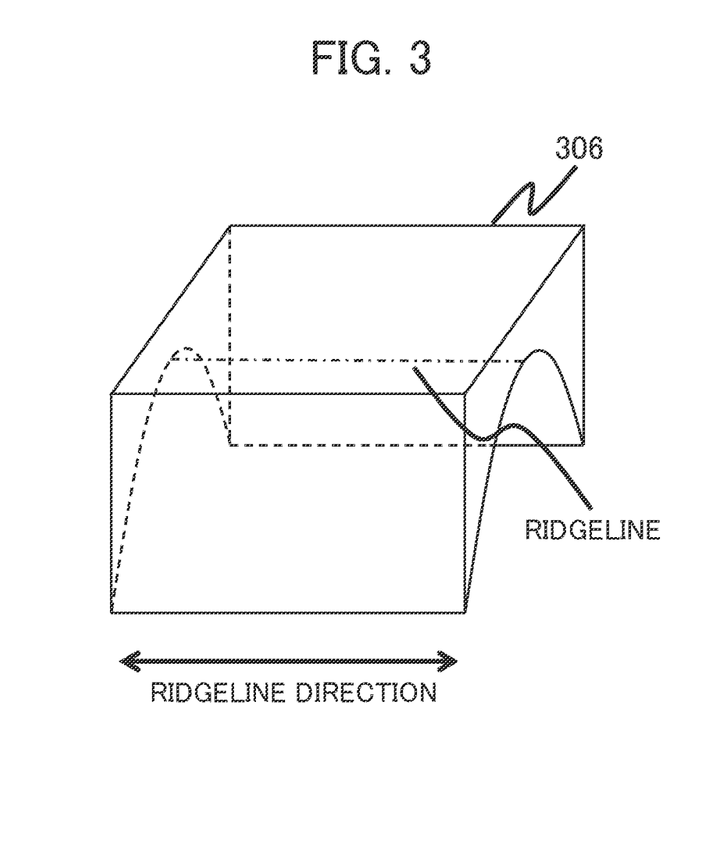
FIG. 3 illustrates an exemplary schematic shape of a cylindrical mirror in FIG. 1.

FIG. 3 illustrates one example of a schematic shape of the cylindrical mirror 306. In this example, the cylindrical mirror 306 has a parabola section defined by a plane perpendicular to the ridgeline, and is shaped to have a paraboloid formed such that the parabola has the same curvature at any place on the ridgeline. Although a mirror having such a shape may be referred to as "paraboloid mirror", the mirror is herein interpreted as one form of "cylindrical mirror" that is thus not limited to a mirror having a cylindrical surface. Such variation in terms can be appropriately understood by those skilled in the art. Light reflected by the paraboloid can be focused on one point in principle unlike a reflecting surface, which eliminates a need of using a plurality of spherical mirrors to suppress aberration. In the past, it is extremely difficult to produce at high productivity a mirror having an aspheric surface typified by a paraboloid, in particular, an aspheric mirror having a large diameter. Through technical improvement, however, the invention uses a large-diameter mirror having an effective diameter of more than 10 mm in the illumination optical system.

The cylindrical mirror 306 is an optical element that collects light in a uniaxial direction. The light collecting direction (first direction) of the cylindrical mirror 306 is perpendicular to the plane of paper of FIG. 1 and perpendicular to the light collecting direction (second direction) of the cylindrical lens 304. Herein, the "perpendicular" state may not refer to only a strictly perpendicular state, but may include a tolerance within a certain allowable range (for example, within a range in which functions of the illumination optical system can be practically achieved).

The focal length of the cylindrical mirror 306 is designed such that light is collected on the inspection object 307.

The ridgeline of the cylindrical mirror 306 is desirably arranged parallel or substantially parallel to the inspection objective surface of the inspection object 307. Such arrangement makes it possible to form a linear beam spot on the inspection object 307 such that the longitudinal direction of the beam spot corresponds to the horizontal direction on the plane of paper of FIG. 1.

The focal length of the cylindrical lens 304 is represented as fB, the focal length of the cylindrical mirror 306 is represented as fA, a beam elevation angle incident on the inspection object 307 is represented as θ, and the wavelength of a light beam from a light source is represented as λ. The light incident on the cylindrical lens 304 is assumed to have a shape of a true circle or a substantially true circle with a radius D. In this case, a relation between a lateral beam spot diameter φA and a longitudinal beam spot diameter φB is exemplarily expressed by the following formulas.

$$\varphi A = 1.22 \cdot fA \times \lambda / (D \sin \theta)$$

$$\varphi B = 1.22 \cdot fB \times \lambda / (D \sin \theta)$$

As a result, φB/φA=fB/fA is given. In other words, an aspect ratio of the beam spot diameter can be controlled by controlling a ratio of the focal length. Such a focal length ratio can be controlled by the control unit.

In the first embodiment, fB>fA is true. That is, since the cylindrical lens 304 is disposed on the side near the laser light source 301 with respect to the cylindrical mirror 306 as described above, the focal length fB (focal length with respect to the inspection object 307) of the cylindrical lens 304 is longer than the focal length fA (focal length with respect to the inspection object 307) of the cylindrical mirror 306.

As described above, according to the illumination optical system of the first embodiment, the light beam can be collected linearly and accurately.

Specifically, the light beam can be collected linearly and accurately regardless of an angle of light incident on the inspection object 307.

According to the first embodiment, since no rotationally-symmetrical optical element is used, the light beam can be collected linearly without an anamorphic prism. As a result, the illumination optical system can be made more inexpensive or smaller.

The cylindrical mirror 306 is an aspheric mirror, and may be produced using a special aspheric surface polishing machine such as a magnetic fluid polishing machine. In such a case, if the aspheric surface polishing machine is used from an early state where a base material of the cylindrical mirror 306 is a rectangular parallelepiped bulky material, enormous time is required, and cost may increase.

Hence, processing cost of the cylindrical mirror 306 may be reduced by decreasing the amount of polishing with the aspheric surface polishing machine as much as possible. As described above, in the cylindrical mirror 306 of the first embodiment, the cross section defined by a plane perpendicular to the ridgeline shows a paraboloid having the same curvature at any place on the ridgeline. Such a shape enables that a spherical-cylindrical mirror, which can be produced using a traditional polishing method of a spheric lens, is first produced, and then the spherical-cylindrical mirror is processed with the aspheric surface polishing machine until a target paraboloid is formed, making it possible to minimize the polishing amount and reduce production cost of the cylindrical mirror 306.

In FIG. 1, a light beam collected by the cylindrical lens 304 and the cylindrical mirror 306 is directly collected on the inspection object 307. In a modification, the light beam may be once collected into an image in the air by the cylindrical lens 304 and the cylindrical mirror 306, and then collected again on the inspection object 307 through a relay optical system.

Second Embodiment

Figure 4:
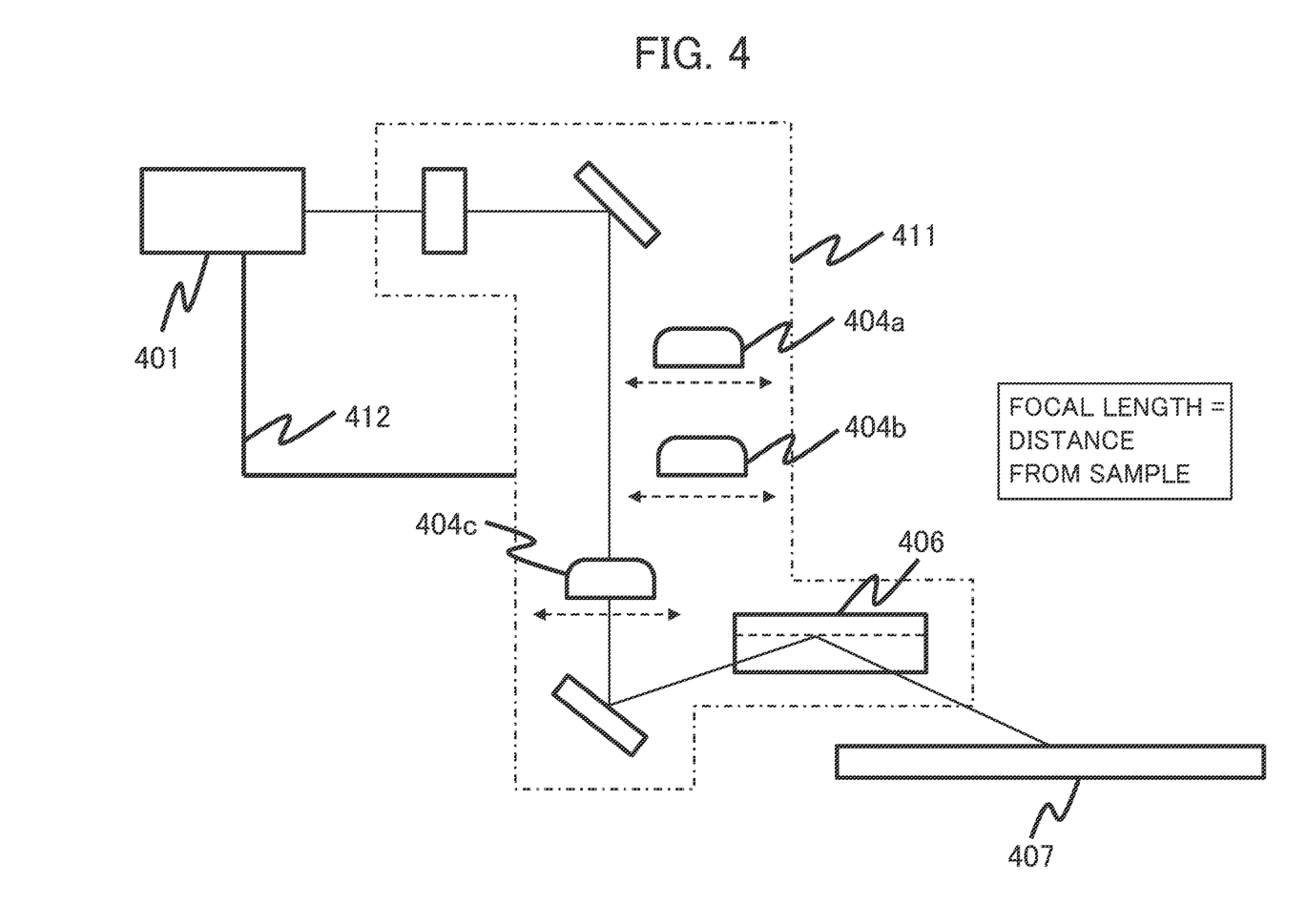
FIG. 4 illustrates a configuration of an illumination optical system according to a second embodiment of the invention.

FIG. 4 illustrates a configuration of an illumination optical system according to a second embodiment of the invention. The configuration of the second embodiment is given by modifying the configuration of the first embodiment such that a plurality of cylindrical lenses are used in a switched manner. Differences from the first embodiment are now described.

In case of a substrate inspection apparatus that scans a single inspection object (such as one wafer) to detect a particle, when a longitudinal beam spot diameter is increased, the number of scanning times decreases and thus the entire surface of the wafer can be inspected in shorter time, but positional accuracy of the particle is reduced. In some case, therefore, the longitudinal beam spot diameter is desirably changeable in one illumination optical system depending on material of an inspection object, size of an inspection object, or inspection speed.

For example, various longitudinal beam spot diameters of parallel light may be required in an illumination optical system mounted in the inspection apparatus. In an exemplary method to meet such a requirement, a plurality of anamorphic prisms having different magnifications are prepared in the apparatus, and the anamorphic prism is disposed on an optical path in a switchable manner to change ellipticity of an emitted beam so that diameter of a beam incident on a condenser lens is changed, resulting in various beam diameters. However, such an anamorphic prism set including a plurality of anamorphic prisms is large and inevitably leads to a large number of optical elements, causing high cost. In addition, the anamorphic prisms must be prepared to the number of required longitudinal beam diameter modes, resulting in an increase in size or cost of the illumination optical system.

Figure 6:
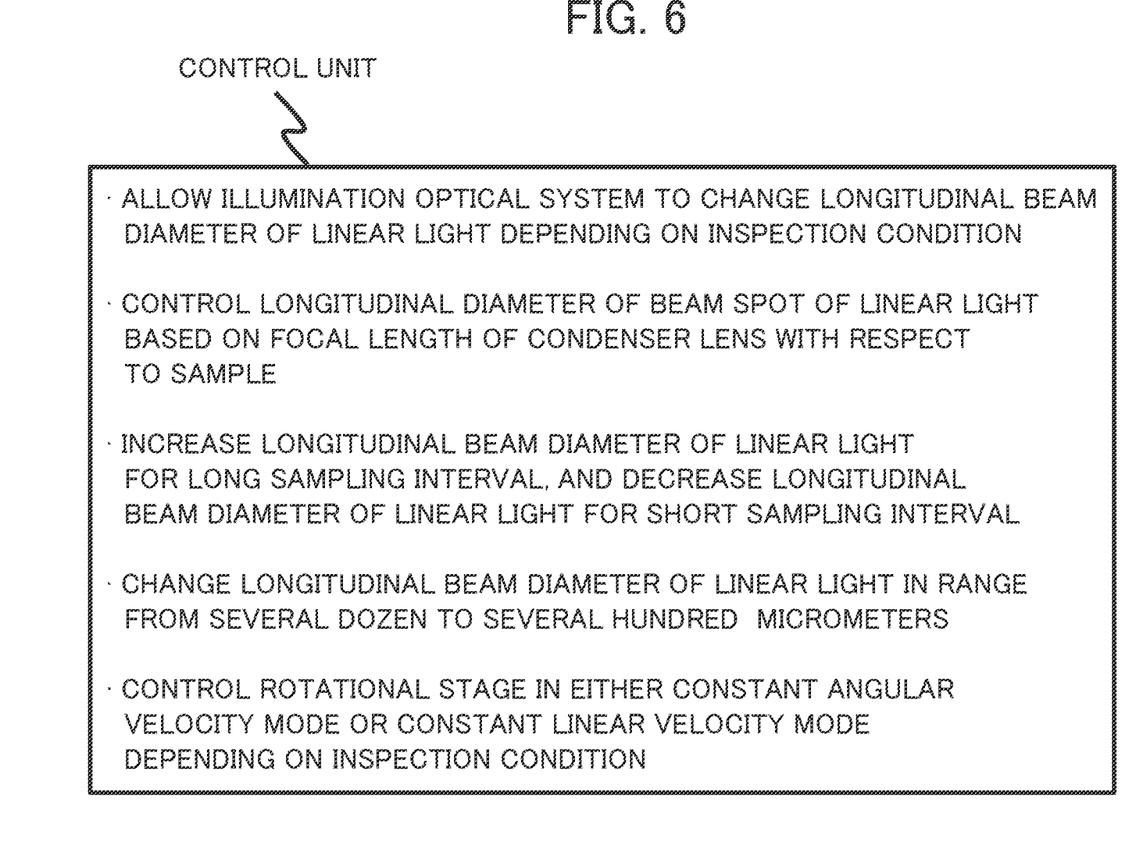
FIG. 6 illustrates functions of a control unit.

For parallel light from a light source, changing the longitudinal beam diameter is an important function of the substrate inspection apparatus. In case of larger longitudinal beam diameter of the parallel light, since a larger region can be scanned in one rotation, time required for scanning the entire surface of the wafer can be reduced. On the other hand, in case of smaller longitudinal beam diameter of the parallel light, since a smaller area is irradiated, the amount of noise light scattered from a portion other than a defect can be reduced. This increases a signal to noise ratio, allowing defect inspection at high sensitivity. For the substrate inspection apparatus, an inspection condition is desirably selectable in one apparatus depending on desired sensitivity and a desired speed level. A sampling interval for an inspection object is also changed depending on various inspection conditions. As illustrated in FIG. 6, therefore, the control unit desirably changes the longitudinal beam diameter of parallel light (linear light) in a range from 10 to 1000 μm (preferably from several dozen to several hundred micrometers) in correspondence to the sampling interval.

The substrate inspection apparatus incorporating the illumination optical system as described in the invention includes a stage that holds a specimen and an input unit that selects an inspection condition. An operator can select a desired inspection condition depending on inspection steps and applications. The substrate inspection apparatus further includes a control unit. The control unit controls the stage and the illumination optical system depending on the inspection condition selected by the input unit. As illustrated in FIG. 6, the control unit controls the illumination optical system to change the longitudinal beam diameter of the linear light depending on the inspection condition. An analysis unit 510 described later is included in the control unit.

When the substrate inspection apparatus holds an inspection object on a rotary stage to perform inspection, there are stage operation modes such as, for example, a constant angular velocity (CAV) mode and a constant linear velocity (CLV) mode. Depending on the inspection condition received from the input unit, the control unit determines such a stage operation mode and controls velocity of R and velocity of θ of the stage. Specifically, as illustrated in FIG. 6, the control unit controls the rotary stage in either the constant angular velocity operation mode or the constant linear velocity operation mode depending on the inspection condition. A sampling interval in a plane of the wafer as the inspection object varies depending on such different operation modes. Large longitudinal beam diameter of parallel light from a light source is desired for an inspection condition of a long sampling interval. Conversely, small longitudinal beam diameter of the parallel light from the light source is desired for a short sampling interval. The control unit therefore controls the illumination optical system to provide the optimum beam diameter of the parallel light depending on the stage operation mode. The illumination optical system of the first embodiment is also allowed to perform such a flexible change in beam diameter depending on the inspection condition. In the second embodiment, such control is performed further flexibly. Specifically, as illustrated in FIG. 6, the control unit, depending on the inspection condition, controls the illumination optical system to increase the longitudinal beam diameter of the linear light in case of a long sampling interval for the specimen, but controls the illumination optical system to decrease the longitudinal beam diameter of the linear light in case of a short sampling interval for the specimen.

As described with reference to the first embodiment, the ratio $\varphi B/\varphi A$ of the longitudinal beam spot diameter $\varphi B$ to the lateral beam spot diameter $\varphi A$ is determined only by the focal length of the cylindrical lens and the focal length of the cylindrical mirror. This makes it possible to change the longitudinal beam spot diameter on the inspection object by preparing a plurality of cylindrical lenses having different focal lengths and disposing the cylindrical lens in a switched manner.

As illustrated in FIG. 4, a collecting optical system 411 in the illumination optical system of the second embodiment includes a plurality of cylindrical lenses 404a, 404b, and 404c as the condenser lenses. The cylindrical lenses 404a, 404b, and 404c have different focal lengths from one another.

The illumination optical system further includes a switching mechanism of the cylindrical lenses 404a, 404b, and 404c. The switching mechanism is achieved in a form of a support structure 412, for example. The support structure 412 is connected to the cylindrical lenses 404a, 404b, and 404c.

The support structure 412 moves the respective cylindrical lenses 404a, 404b, and 404c to dispose one of the cylindrical lenses 404a, 404b, and 404c on an optical path from a laser light source 401 to an inspection object 407 (specimen) and dispose other cylindrical lenses outside the optical path.

Although a configuration and operation of the support structure 412 are not specifically described, they can be appropriately designed based on known techniques by those skilled in the art. Although a configuration of the support structure 412 can be simplified by moving each of the cylindrical lenses 404a, 404b, and 404c in a plane perpendicular to the optical path, the invention is not limited thereto.

In the second embodiment, it is possible to achieve three types of longitudinal beam spot diameters on the inspection object by disposing any one of the cylindrical lenses 404a, 404b, and 404c on the optical path. Each cylindrical lens is disposed at a position at which a focal length of the cylindrical lens is equal to a distance from the wafer. A cylindrical lens having a longer focal length provides a larger longitudinal diameter of a spot formed on the wafer. Hence, the cylindrical lens to be disposed on the optical path can be changed depending on the longitudinal diameter of the spot formed on the wafer as required for a measurement condition. For example, as illustrated in FIG. 6, the control unit controls the longitudinal diameter of the beam spot of linear light based on the focal length of each of the cylindrical lenses 404a, 404b, and 404c with respect to the wafer.

As described above, according to the illumination optical system of the second embodiment, the light beam can be collected linearly and accurately as in the first embodiment. Other advantageous effects as described in the first embodiment can also be provided.

In a modification of the second embodiment, a single zoom lens with a variable focal length or a variable focal length lens may be used in place of the cylindrical lenses 404a, 404b, and 404c. In such a case, however, at least two cylindrical lenses exist at any time on the optical axis and thus transmittance is slightly reduced. In light of improving transmittance, therefore, it is desirable to provide a configuration where a lens is disposed on the optical path in a switched manner as in the second embodiment.

Although the switching mechanism given by the support structure 412 disposes the three cylindrical lenses in a switched manner as shown in FIG. 4 in the second embodiment, the number of the switchable cylindrical lenses is not limited to three.

In a comparative example, a toroidal mirror or a free-form surface mirror having a biaxial light collecting direction can be used in place of the cylindrical mirror 406. In such a case, however, the longitudinal beam spot diameter cannot be changed by changing the cylindrical lens disposed on the optical path unlike the second embodiment, and thus an anamorphic prism must be used. In addition, the amount of polishing of the spherical-cylindrical mirror increases in mirror polishing, and thus processing time increases, causing an increase in cost. Consequently, a balance between performance and cost is better in the configuration using the combination of the cylindrical lenses and the cylindrical mirror as in the second embodiment than in such a comparative example.

Third Embodiment

Figure 5:
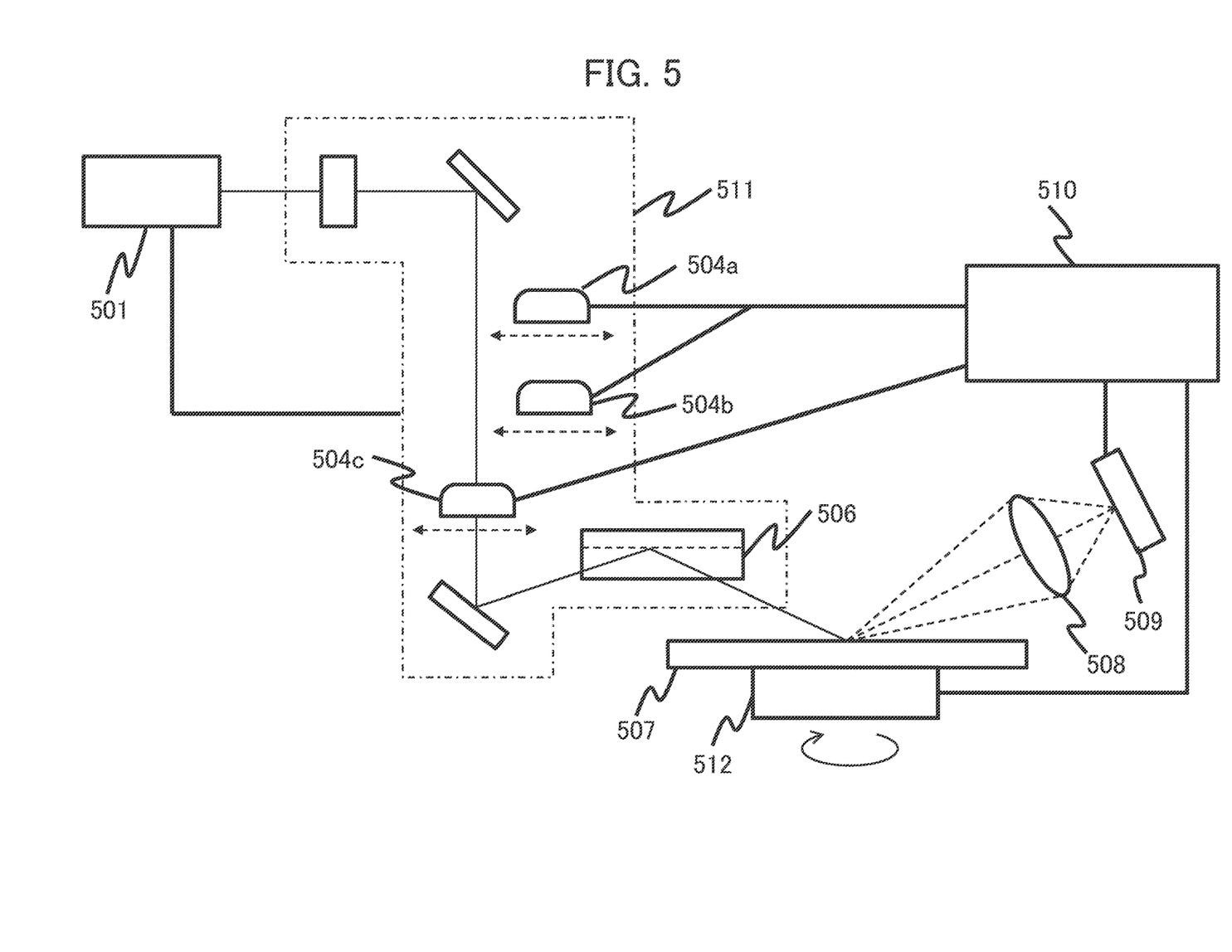
FIG. 5 illustrates a configuration of a substrate inspection apparatus according to a third embodiment of the invention.

FIG. 5 illustrates a configuration of a substrate inspection apparatus according to a third embodiment of the invention. The substrate inspection apparatus incorporates the illumination optical system of the second embodiment. Differences from the second embodiment are now described.

In the third embodiment, a substrate is used as an inspection object 507 (specimen). The inspection object 507 is fixed on a stage 512. The stage 512 is rotatable around a rotational axis in a vertical direction on the plane of paper of FIG. 5, and is translatable in a direction perpendicular to the rotational axis (for example, a horizontal direction on the plane of paper of FIG. 5). In this example, a longitudinal direction of a linear beam spot formed by the illumination optical system is assumed to correspond to the horizontal direction.

The inspection object 507 has a disc-like shape and translates while being rotated by the stage 512, so that the entire surface of the disc can be irradiated with light.

The substrate inspection apparatus includes a light receiving lens 508, a light receiving element 509, and an analysis unit 510. The light receiving lens 508 collects part of diffusely-reflected light generated when light impinges on a defect or a particle on the inspection object 507. The light receiving element 509 converts light collected by the light receiving lens 508 to an electric signal.

The analysis unit 510 analyzes the electric signal from the light receiving element 509, and outputs an obtained inspection result. To achieve this, the analysis unit 510 may include a computer. The analysis unit 510 is included in the control unit.

In this way, the substrate inspection apparatus inspects the inspection object 507. Since the light beam output by the illumination optical system is collected linearly and accurately as described above, accurate inspection can be performed. Other advantageous effects as described in the first and second embodiments can also be provided.

The analysis unit 510 has, in addition to the signal analysis function, a function of selecting one of cylindrical lenses 504a, 504b, and 504c to be disposed on the optical path and appropriately disposing the selected cylindrical lens. Such selection may be performed according to input by a user of the substrate inspection apparatus, or may be automatically performed by the analysis unit 510 itself. When the analysis unit 510 automatically performs the selection, the analysis unit 510 may select a cylindrical lens such that the electric signal obtained by the light receiving element 509 is optimum for target inspection.

Although FIG. 5 shows one light receiving lens 508 and one light receiving element 509, a plurality of light receiving lenses 508 and/or a plurality of light receiving elements 509 may be provided.

Although the illumination optical system of the second embodiment is used as the illumination optical system in the third embodiment, the illumination optical system of the first embodiment may be used instead.

The third embodiment relates to the substrate inspection apparatus, and thus the inspection object 507 is a substrate or a wafer. In a modification, the third embodiment may relate to an inspection apparatus that inspects another type of inspection object 507.

Each of the first to third embodiments can be modified as follows.

In the first to third embodiments, the laser light sources 301, 401, and 501 each emit parallel light. Although such a configuration facilitates design of each of the light collecting optical systems 311, 411, and 511, the advantageous effects of the invention can be provided not only in case of strictly parallel light but also in case of roughly parallel light. The advantageous effects of the invention may be somewhat provided in case of light other than parallel light.

In the first to third embodiments, any of the cylindrical lenses 304, 404a, 404b, 404c, 504a, 504b, and 504c and the cylindrical mirrors 306, 406, and 506 is configured of a single member. This preferably increases transmittance of the illumination optical system. In a modification, however, one or all of the cylindrical lenses and the cylindrical mirrors may be configured of a plurality of members.

In the first to third embodiments, any of the cylindrical lenses 304, 404a, 404b, 404c, 504a, 504b, and 504c and the cylindrical mirrors 306, 406, and 506 is a light collecting element that collects light only in a uniaxial direction. This preferably allows light collecting along each axis to be independently designed. In a modification, however, one or all of the cylindrical lenses and the cylindrical mirrors may be a light collecting element that collects light in a biaxial direction. In such a case, the light collecting element may be designed such that light collection is strong in a major axis direction (corresponding to the light collecting direction in the first embodiment) and weak in a minor axis direction. In such a case, the light collecting element is designed such that the major axis direction of any of the cylindrical lenses 304, 404a, 404b, 404c, 504a, 504b, and 504c is perpendicular to the major axis direction of any of the cylindrical mirrors 306, 406, and 506.

Although light collection is easily designed in the first to third embodiments because the cylindrical lenses 304, 404a, 404b, 404c, 504a, 504b, and 504c are used, another optical element may be used instead. A condenser lens having another shape, which collects light in the second direction, may be used.

Although light collection is easily designed in the first to third embodiments because the cylindrical mirrors 306, 406, and 506 are used, another optical element may be used instead. A light collecting mirror having another shape, which collects light in the first direction, may be used.

LIST OF REFERENCE SIGNS 301, 401, 501 Laser light source (light source)
302 Attenuator
303, 305 Mirror
304, 404a, 404b, 404c, 504a, 504b, 504c Cylindrical lens (condenser lens)
306, 406, 506 Cylindrical mirror
307, 407, 507 Inspection object (specimen)
311, 411, 511 Light collecting optical system
312, 412 Support structure
508 Light receiving lens
509 Light receiving element
510 Analysis unit
512 Stage

The invention claimed is:

1. An illumination optical system that comprises a light source and a collecting optical system and collects light from the light source on a specimen, wherein
   the light collecting optical system includes a cylindrical mirror and at least one condenser lens,
   the cylindrical mirror has a parabola section defined by a plane perpendicular to a ridgeline of the cylindrical mirror, and has a paraboloid formed such that the parabola has the same curvature at any place on the ridgeline, and collects the light in a first direction with the paraboloid,
   the condenser lens collects the light in a second direction perpendicular to the first direction, and
   focal length of the condenser lens is longer than focal length of the cylindrical mirror.

2. The illumination optical system according to claim 1, wherein the light source emits linear light.

3. The illumination optical system according to claim 1, wherein the light collecting optical system includes a plurality of the condenser lenses and a support structure connected to the condenser lenses, and
   the support structure moves the respective condenser lenses to dispose one of the condenser lenses on an optical path from the light source to the specimen and dispose other condenser lenses outside the optical path.

4. The illumination optical system according to claim 3, wherein the support structure moves each of the condenser lenses in a plane perpendicular to the optical path.

5. The illumination optical system according to claim 4, wherein each of the condenser lenses is disposed at a position at which a focal length of that condenser lens is equal to a distance from the specimen.

6. A substrate inspection apparatus incorporating the illumination optical system according to claim 2,
   the substrate inspection apparatus comprising:
   a stage that holds the specimen;
   an input unit that selects an inspection condition; and
   a control unit that controls the illumination optical system and the stage depending on the inspection condition,
   wherein the control unit controls the illumination optical system to change longitudinal beam diameter of the linear light depending on the inspection condition.

7. The substrate inspection apparatus according to claim 6, wherein the control unit controls longitudinal diameter of a beam spot of the linear light based on the focal length of the condenser lens with respect to the specimen.

8. The substrate inspection apparatus according to claim 6, wherein the control unit, depending on the inspection condition, controls the illumination optical system to increase the longitudinal beam diameter of the linear light in case of a long sampling interval for the specimen, but controls the illumination optical system to decrease the longitudinal beam diameter of the linear light in case of a short sampling interval for the specimen.

9. The substrate inspection apparatus according to claim 8, wherein the control unit changes the longitudinal beam diameter of the linear light in a range from several dozen to several hundred micrometers.

10. The substrate inspection apparatus according to claim 9, wherein the stage is a rotary stage, and
    the control unit controls the rotary stage in either a constant angular velocity operation mode or a constant linear velocity operation mode depending on the inspection condition.

* * * * *